(12) United States Patent
Thompson (10) Patent No.: US 10,196,145 B2
(45) Date of Patent: *Feb. 5, 2019

(54) SYSTEM AND METHOD FOR AFFIXING GATEBOXES TO AN AIRCRAFT

(71) Applicant: Larry D. Thompson, Iowa Park, TX (US)

(72) Inventor: Larry D. Thompson, Iowa Park, TX (US)

(73) Assignee: Texas Transland LLC, Wichita Falls, TX (US)

( * ) Notice: Subject to any disclaimer, the term of this patent is extended or adjusted under 35 U.S.C. 154(b) by 405 days.

This patent is subject to a terminal disclaimer.

(21) Appl. No.: 14/064,561

(22) Filed: Oct. 28, 2013

(65) Prior Publication Data
US 2014/0048653 A1 Feb. 20, 2014

Related U.S. Application Data

(63) Continuation of application No. 13/078,286, filed on Apr. 1, 2011, now Pat. No. 8,579,234.

(51) Int. Cl.
| | |
|---|---|
| B64D 1/00 | (2006.01) |
| B64C 39/02 | (2006.01) |
| B64D 1/16 | (2006.01) |
| B64D 1/18 | (2006.01) |
| B64C 7/00 | (2006.01) |
| B66F 5/00 | (2006.01) |
| B64F 5/50 | (2017.01) |

(52) U.S. Cl.
CPC ............ *B64D 1/00* (2013.01); *B64C 7/00* (2013.01); *B64C 39/02* (2013.01); *B64D 1/16* (2013.01); *B64D 1/18* (2013.01); *B64F 5/50* (2017.01); *B66F 5/00* (2013.01); *Y10T 29/49826* (2015.01)

(58) Field of Classification Search
CPC . B64D 1/16; B64D 1/18; B64D 37/26; B64D 1/02; B64D 37/12; B64D 1/00; B64D 2033/045; B64D 45/00; B64D 7/00; B64D 15/10; B64D 1/10; B64D 1/12; B64D 1/20; B64D 25/00; B64D 7/08; B64F 5/0036
See application file for complete search history.

(56) References Cited

U.S. PATENT DOCUMENTS

| | | | |
|---|---|---|---|
| 2,173,890 A * | 9/1939 | Tuttle | B60H 1/262 296/215 |
| 2,613,822 A * | 10/1952 | Stanley | F41A 9/87 182/2.2 |
| 2,614,733 A * | 10/1952 | Anderson | 222/512 |

(Continued)

OTHER PUBLICATIONS

Aerial Application: Professional Development Continuing Education Course; Jan. 29, 2009; Technical Learning College. (Year: 2009).*

*Primary Examiner* — Tien Q Dinh
*Assistant Examiner* — Michael A. Fabula
(74) *Attorney, Agent, or Firm* — Baker Botts, L.L.P.

(57) ABSTRACT

A system for affixing a gatebox to an aircraft includes a first type of gatebox operable to release material from an aircraft, a second type of gatebox operable to release material from the aircraft, a frame coupled to the aircraft operable to receive a selected one of the first type of gatebox and the second type of gatebox; and a plurality of fastenings operable to secure the selected one of the first type of gatebox and the second type of gatebox to the frame.

20 Claims, 6 Drawing Sheets

(56) References Cited

U.S. PATENT DOCUMENTS

| | | | | |
|---|---|---|---|---|
| 2,712,874 A | * | 7/1955 | Murray | B60P 3/11 254/10 R |
| 2,896,909 A | * | 7/1959 | Taylor | B60P 1/025 254/134 |
| 3,167,208 A | * | 1/1965 | Proctor | E05C 19/14 220/324 |
| 3,273,651 A | | 9/1966 | Andres | |
| 3,352,459 A | * | 11/1967 | Sustrich et al. | 222/85 |
| 3,423,053 A | * | 1/1969 | Hawkshaw | B64D 1/16 116/215 |
| 3,459,936 A | * | 8/1969 | Miller | F21S 8/033 123/80 D |
| 3,469,732 A | * | 9/1969 | Foster | B65D 41/18 220/835 |
| 3,476,337 A | * | 11/1969 | Cornett, Jr. | B64D 1/18 239/171 |
| 3,547,000 A | | 12/1970 | Haberkorn et al. | |
| 3,714,987 A | * | 2/1973 | Mattson | B64D 1/16 137/533.13 |
| 3,729,156 A | * | 4/1973 | Wright | 244/136 |
| 3,754,601 A | * | 8/1973 | Linkewich | B64D 1/16 169/44 |
| 3,777,978 A | * | 12/1973 | Manicatide | A01C 15/04 239/171 |
| 3,860,202 A | * | 1/1975 | Johnson | B64D 1/16 222/189.02 |
| 4,412,774 A | * | 11/1983 | Legrand | B64F 5/50 180/298 |
| 4,461,455 A | * | 7/1984 | Mills | B64F 5/50 180/125 |
| 4,522,548 A | * | 6/1985 | Oswald | B60P 3/00 254/8 C |
| 4,526,344 A | * | 7/1985 | Oswald | B64F 1/32 254/122 |
| 4,790,350 A | * | 12/1988 | Arnold | B64D 37/12 137/588 |
| 4,877,203 A | * | 10/1989 | Harden | A61G 17/08 222/400.7 |
| 5,005,784 A | * | 4/1991 | Harden | B64D 1/16 222/181.2 |
| 5,279,481 A | * | 1/1994 | Trotter | G05D 7/0635 169/53 |
| 5,326,053 A | * | 7/1994 | Pahl | B64D 1/16 169/53 |
| 5,381,721 A | * | 1/1995 | Holmstrom | B64D 1/02 89/1.41 |
| 5,451,016 A | * | 9/1995 | Foy | B64D 1/16 169/53 |
| 5,775,641 A | * | 7/1998 | Goon | B64D 1/10 244/118.1 |
| 5,967,462 A | * | 10/1999 | Foster | B64D 1/16 244/105 |
| 6,003,782 A | * | 12/1999 | Kim | B64D 47/08 169/53 |
| 6,340,191 B1 | * | 1/2002 | Brady | B60R 3/00 280/164.1 |
| 6,668,950 B2 | * | 12/2003 | Park | B60B 19/003 180/20 |
| 6,769,493 B1 | * | 8/2004 | Fima | A01C 7/085 169/51 |
| 7,819,362 B2 | * | 10/2010 | Hale | B64D 1/16 137/899.2 |
| 8,548,649 B2 | * | 10/2013 | Guyette | A01B 79/005 111/170 |
| 8,579,234 B2 | * | 11/2013 | Thompson | 244/136 |
| 8,640,782 B2 | * | 2/2014 | Parker | A62C 3/0242 169/53 |
| 2004/0062630 A1 | * | 4/2004 | Marrero | F41A 9/87 414/589 |
| 2005/0072880 A1 | * | 4/2005 | Nolan | B64D 1/16 244/136 |
| 2008/0099622 A1 | * | 5/2008 | Yoffe | B64D 1/02 244/137.4 |
| 2011/0192934 A1 | * | 8/2011 | Mark | B64D 1/16 244/118.1 |
| 2011/0264307 A1 | * | 10/2011 | Guyette | A01B 79/005 701/3 |
| 2013/0056230 A1 | * | 3/2013 | Lemke | A62C 3/0242 169/44 |
| 2013/0199804 A1 | * | 8/2013 | Parker | A62C 3/0242 169/46 |
| 2014/0032020 A1 | * | 1/2014 | Guyette | G01S 19/54 701/3 |
| 2014/0069666 A1 | * | 3/2014 | Vetesnik | A62C 3/0235 169/53 |
| 2014/0145007 A1 | * | 5/2014 | Thompson | B64D 1/16 239/171 |
| 2014/0145034 A1 | * | 5/2014 | Thompson | B64D 1/16 244/136 |
| 2016/0221693 A1 | * | 8/2016 | Davis | B60P 1/025 |
| 2017/0072236 A1 | * | 3/2017 | Cordani | A62C 5/002 |

* cited by examiner

SYSTEM AND METHOD FOR AFFIXING GATEBOXES TO AN AIRCRAFT

RELATED APPLICATION

This application is a continuation of U.S. application Ser. No. 13/078,108 filed Apr. 1, 2011 and entitled "System and Method for Affixing Gateboxes to an Aircraft," now U.S. Pat. No. 8,579,234.

TECHNICAL FIELD

This invention relates generally to the field of gateboxes for aircraft, and more specifically to a system and method for affixing gateboxes to an aircraft.

BACKGROUND

Various types of gateboxes may be used with an aircraft. One type of gatebox may be removed from the aircraft and another type of gatebox may be installed. Changing the types of gatebox attached to an aircraft is time consuming and removes the aircraft from useful operation for an extended time period, which can be costly.

SUMMARY OF THE DISCLOSURE

In accordance with the present invention, disadvantages and problems associated with previous techniques for affixing gateboxes to an aircraft may be reduced or eliminated.

According to one embodiment of the present invention, a system for affixing a gatebox to an aircraft includes a first type of gatebox operable to release material from an aircraft, a second type of gatebox operable to release material from the aircraft, a frame coupled to the aircraft operable to receive a selected one of the first type of gatebox and the second type of gatebox; and a plurality of fastenings operable to secure the selected one of the first type of gatebox and the second type of gatebox to the frame.

According to another embodiment of the present invention, an apparatus for affixing a gatebox to an aircraft includes a frame affixable to an aircraft, wherein the frame is operable to receive a first type of gatebox and a second type of gatebox, a compressible seal operable to create a barrier between the frame and a selected one of the first type of gatebox and the second type of gatebox, and a plurality of fastenings operable to couple the selected one of the first type of gatebox and the second type of gatebox to the frame.

According to yet another embodiment of the present invention, a method for affixing a gatebox to an aircraft includes providing a first type of gatebox operable to release material from an aircraft, providing a second type of gatebox operable to release material from the aircraft, coupling a frame operable to receive a selected one of the first type of gatebox and the second type of gatebox to the aircraft, providing a plurality of fastenings operable to secure the selected one of the first type of gatebox and the second type of gatebox to the frame, and securing the selected one of the first type of gatebox and the second type of gatebox to the frame with the fastenings.

Certain embodiments of the invention may provide one or more technical advantages. A technical advantage of one embodiment includes reducing the time and personnel required to attach, detach, and/or switch gateboxes on an aircraft. Another technical advantage of an embodiment is that tools may not be required to attach, detach, and/or switch gateboxes on an aircraft. Therefore, the amount of time, the amount of training, the amount of workers, and the number of tools required to attach, detach, and/or switch gateboxes on an aircraft is reduced. Accordingly, the aircraft spends less time out of useful operation due to attaching, detaching, and/or switching gateboxes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
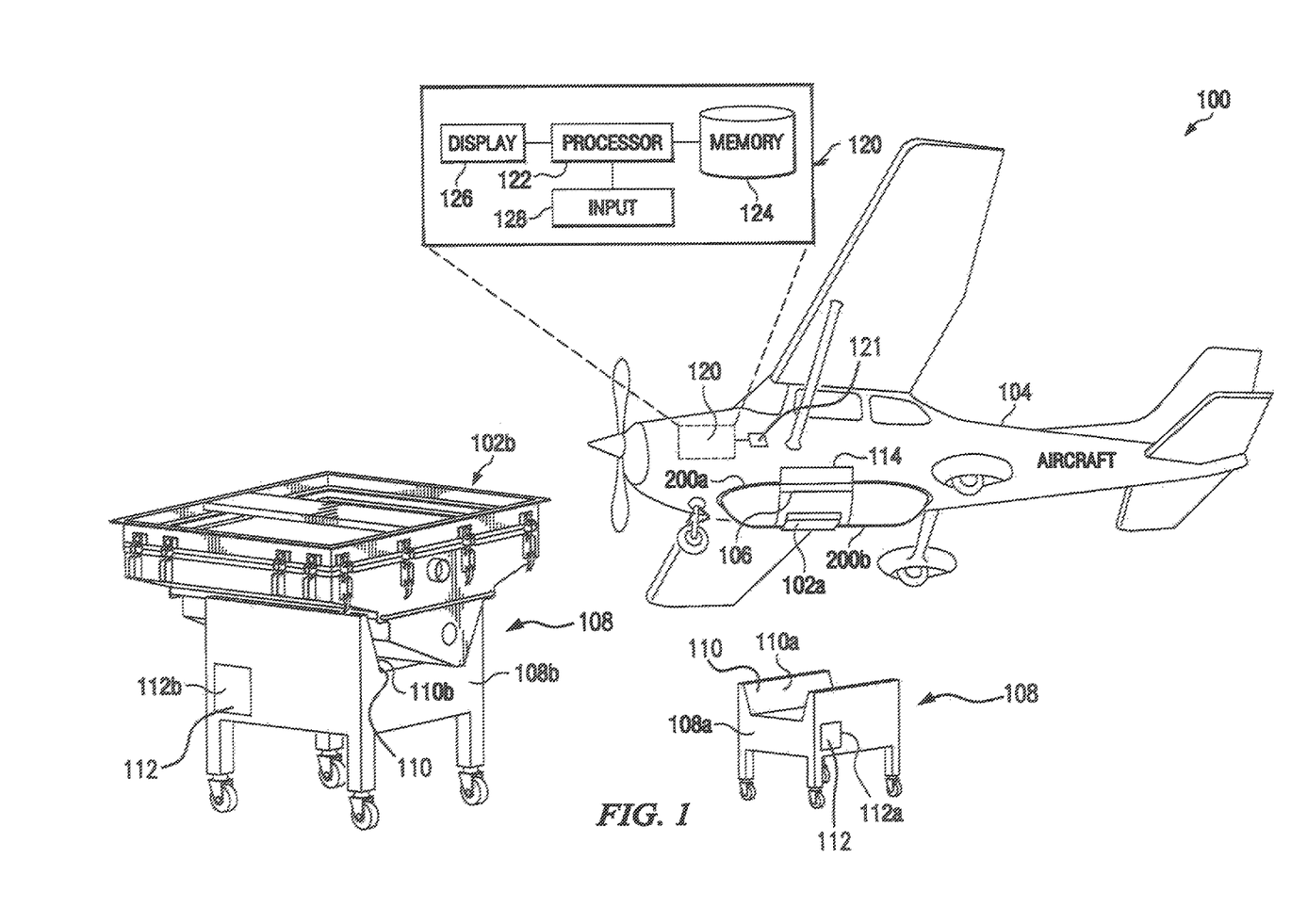
FIG. 1 is a block diagram illustrating a system for affixing a gatebox to an aircraft.

FIG. 1 is a block diagram illustrating system 100 for affixing a gatebox 102 to an aircraft 104. System 100 includes an aircraft 104, an adaptor frame 106, a first gatebox 102a, and a second gatebox 102b. Aircraft 104 equipped with adaptor frame 106 enhances a user's ability to quickly affix gateboxes 102 to aircraft 104.

Aircraft 104 represents any suitable transportation apparatus that may accommodate adaptor frame 106. In the illustrated embodiment aircraft 104 is an airplane. In other embodiments, aircraft 104 may be a helicopter, powered lighter-than-air craft, or other powered flight vehicle that may accommodate adaptor frame 106. A user may operate aircraft 104 to release material from aircraft 104 over a surface.

Aircraft 104 includes various components that allow a user to release material over the surface. For example, in the illustrated embodiment, aircraft 104 includes one or more tanks (also known as hoppers) 114. Tank 114 is operable to hold material that is released over a surface. For example, tank 114 holds water that may be released over land that is on fire to facilitate putting out the fire. As another example, tank 114 holds agricultural material that promotes the growth of crops. Tank 114 may include any suitable material that a user desires to release over a large surface in a reduced amount of time.

Aircraft 104 may include a fairing 200. Fairing 200 represents a structure affixable to aircraft 104 that improves the aerodynamic characteristics of aircraft 104 and/or gatebox 102. Aircraft 104 may utilize multiple fairings, for example, a front fairing 200a and a rear fairing 200b. Fairing 200 will be discussed in greater detail in FIG. 2.

Adaptor frame 106 represents a structure affixable to aircraft 104 and operable to secure both a first type of gatebox 102a or a second type of gatebox 102b to aircraft 104. Adaptor frame 106 provides a universal connection between aircraft 104 and gateboxes 102 such that gateboxes 102 may more rapidly and easily attach or detach from adaptor frame 106 than from aircraft 104 alone. Adaptor frame 106 will be discussed in greater detail in FIGS. 3A, 3B, and 4.

Gatebox 102 represents a mechanical device operable to release material from tank 114 while aircraft 104 is in flight. Gatebox 102 may be adapted to release material in a number of manners to accommodate different functions, for example agricultural functions and/or firefighting functions. In the illustrated embodiment, gatebox 102a represents an agricultural gatebox and gatebox 102b represents a firefighting gatebox. Gateboxes 102a and 102b will be discussed in greater detail in FIGS. 3A and 3B, respectively.

Controller 120 represents an electronic device that may control the operation of gateboxes 102 of system 100. For example, controller 120 may facilitate the release of material from gateboxes 102 at specific times, according to specific release rates, according to a particular geographical location, or other suitable criteria. In the illustrated embodiment, controller 120 includes a processor 122, a memory 124, a display 126, and an input 128. Controller 120 may communicate with gatebox 102 through electrical connections from aircraft 104 to gatebox 102. Controller 120 may additionally communicate with other components of aircraft 104, for example, sensors, instruments, avionics, controls, actuators, or any other component of aircraft 104. In an embodiment, controller 120 includes a user interface located in the cockpit of aircraft 104 and the pilot may enter operational parameters for gatebox 102 into controller 120. In another embodiment, a controller 120 may be located in the cockpit of aircraft 104 and an additional controller 120 may be located on another portion of aircraft 104. In yet another embodiment, controller 120 may comprise a split chassis system with a user interface located in the cockpit of aircraft 104.

A component of system 100, for example, processor 122, memory 124, display 126, and input 128, may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer.

Processor 122 represents a device that is operable to manage the operation of controller 120. Examples of processor 120 include one or more computers, one or more microprocessors, one or more applications, and/or other logic. In an embodiment, processor 122 receives a deploy signal to release material and initiates opening of gatebox 102 and the release of material from tank 114 through gatebox 102. In response to the deploy signal, either from manual input from the user or from a GPS unit, processor 122 will signal the gatebox to release the material. In an embodiment, processor 122 may check or record the geographical location, e.g., global positioning system (GPS) coordinates, of aircraft 104 before releasing the material.

Memory 124 stores, either permanently or temporarily, data, operational software, or other information for processor 122. Memory 124 includes any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. Memory 124 may include any suitable information for use in system 100, such as geographical coordinates, material disbursement quantities, characteristics of a material in tank 114, quantities of material distributed over a particular area, control information for gatebox 102, sensor data, code, or any other information relevant to the user, pilot, aircraft 104, gatebox 102, or system 100.

Sensors 121 represent devices operable to determine a particular condition and communicate a signal regarding the condition to processor 122. Aircraft 104 may include any number of sensors 121 that provide information to processor 122 about components of aircraft 104 or system 100. Sensors 121 may measure aircraft velocity, position, location, elevation, trajectory, material flow rate from tank 114 and/or gatebox 102, amount of material in tank 114, weather conditions such as humidity, wind speed, and wind direction, position of gatebox 102 door(s), or other information pertinent to releasing material from aircraft 104 over a surface.

Sensor data represents information received from a sensor and information that processor 122 may use to process information from a sensor. For example, sensor data may include aircraft velocity, position, location, elevation, trajectory, material flow rate from tank 114 and/or gatebox 102, amount of material in tank 114, weather conditions such as humidity, wind speed, and wind direction, position of gatebox 102 door(s), or other information pertinent to releasing material from aircraft 104 over a surface.

Code represents any suitable logic that controls the operation of processor 122. Code includes software, executable files, and/or other appropriate logic modules. For example, code includes executable files capable of facilitating the processing of sensor data or communicating with sensors or gateboxes 102.

In an embodiment, processor 122 may receive sensor data and may further access memory 124 to obtain information related to particular areas of land, amounts of material to distribute, flow rates and disbursement patterns of types of material, and control information, such as code, for gatebox 102. Processor 122 may use sensor data and information from memory 124 to determine when to communicate to gatebox 102 to open its door(s), how far to open the door(s), and how long to leave the door(s) open to release a particular amount of a material from tank 114 over a particular surface.

Display 126 represents any device that can electrically receive information and present it in a visually interpretable manner. Display 126 may be a type of monitor, screen, projector, tablet, television, or any other equivalent device. Display 126 may present information related to aircraft 104, gatebox 102, controller 120, memory 124, input 128, or other component of aircraft 104 or gatebox 102. In an embodiment, display 126 is a touch screen display.

Input 128 represents a device operable to receive commands from a user and communicate the commands to controller 120. Input 128 may include a keyboard, touch screen, mouse, microphone, joystick, buttons, or other transducer operable to communicate commands from a user to controller 120. In an embodiment, the pilot of aircraft 104 may enter information into input 128 to communicate with controller 120 from the cockpit of aircraft 104.

Cart 108 represents a vehicle operable to hold and transport gatebox 102. Cart 108 may also store gatebox 102 when gatebox 102 is not equipped on aircraft 104. Cart 108 may further be operable to raise gatebox 102 to or from aircraft 104. In an embodiment, cart 108 includes support 110 and lift 112. Support 110 represents a secure platform for gatebox 102 to rest on during transport and storage. Cart 108 may include fastenings operable to secure gatebox 102 and/or may be shaped such that gatebox 102 rests securely on cart 108. Fastenings may include straps, latches, clamps, magnets, bolts, screws, or other connectors suitable to secure gatebox 102 to cart 108. Lift 112 represents a device operable to raise gatebox 102 to aircraft 104, or lower gatebox 102 from aircraft 104. Lift 112 may be hydraulic, pneumatic, or other type operable to raise or lower gatebox 102.

Carts 108a and 108b may be adapted for gateboxes 102a and 102b, respectively. For example, the shape of support 110a may be specially adapted to receive gatebox 102a such that gatebox 102a sits securely on cart 108a. Similarly, support 110b may be adapted to receive gatebox 102b. The locations of fastenings, if any, may be different for carts 108a and 108b because of the structural differences between gateboxes 102a and 102b. The location and/or strength of lifts 112a and 112b may be different due to different weights, centers of gravity, and other characteristics of gateboxes 102a and 102b.

In an exemplary embodiment of operation, adaptor frame 106 affixes to aircraft 104. Carts 108 transport gateboxes 102 to and from aircraft 104. For example, cart 108a holding gatebox 102a is positioned under adaptor frame 106. Lift 112a raises gatebox 102a to adaptor frame 106 so that gatebox 102a may secure to adaptor frame 106.

Upon affixing adaptor frame 106 to aircraft 104, gatebox 102a may attach to aircraft 104 via adaptor frame 106. Adaptor frame 106 has a size and a shape compatible to receive gateboxes 102 of system 100. Adaptor frame 106 may further include fastenings to couple with gateboxes 102. In an embodiment, adaptor frame 106 may include a first component 302a of a fastening that is complementary to a second component 302b of fastening 302 on gatebox 102a. Aircraft 104 may have a number of connections to make with gatebox 102a, for example, electrical, fiber optic, hydraulic, pneumatic, or other connection. Connections between aircraft 104 and gatebox 102a may be connected while gatebox 102a rests on cart 108, or after gatebox 102a is secured to aircraft 104. Connections may be quick-release connections that require little time and few, if any, tools to connect and disconnect. In an embodiment, connections include quick-release hydraulic and electrical connections.

A user may detach gatebox 102a from aircraft 104 and attach gatebox 102b to aircraft 104. In an embodiment, user positions cart 108a beneath gatebox 102a. The user engages lift 112a to raise support 110a to gatebox 102a. The user disengages fastenings to detach gatebox 102a from adaptor frame 106. After disengaging fastenings, gatebox 102a rests on support 110a. Connections between gatebox 102a and aircraft 104, for example electrical, fiber optic, hydraulic, pneumatic, or other connections, may also disconnect. Lift 110a lowers gatebox 102a to cart 108a and the user moves gatebox 102a away from aircraft 104. The user positions cart 108b holding gatebox 102b under adaptor frame 106. The user engages lift 112b to raise gatebox 102b to adaptor frame 106. The user engages fastenings to secure gatebox 102 to adaptor frame 106. Connections between aircraft 104 and gatebox 102b may be connected while gatebox 102b rests on cart 108, or after gatebox 102b is secured to aircraft 104.

Modifications, additions, or omissions may be made to system 100. In an embodiment, a single type of cart 108 may be operable to receive and hold both gateboxes 102a and 102b. Controller 120 may be compatible with any gatebox 102 of system 100, and controller 102 may be located in anther portion of aircraft 104 or gatebox 102. Adaptor frame 106 may support any gatebox 102 of system 100. The system may include more, fewer, or other components.

Figure 2:
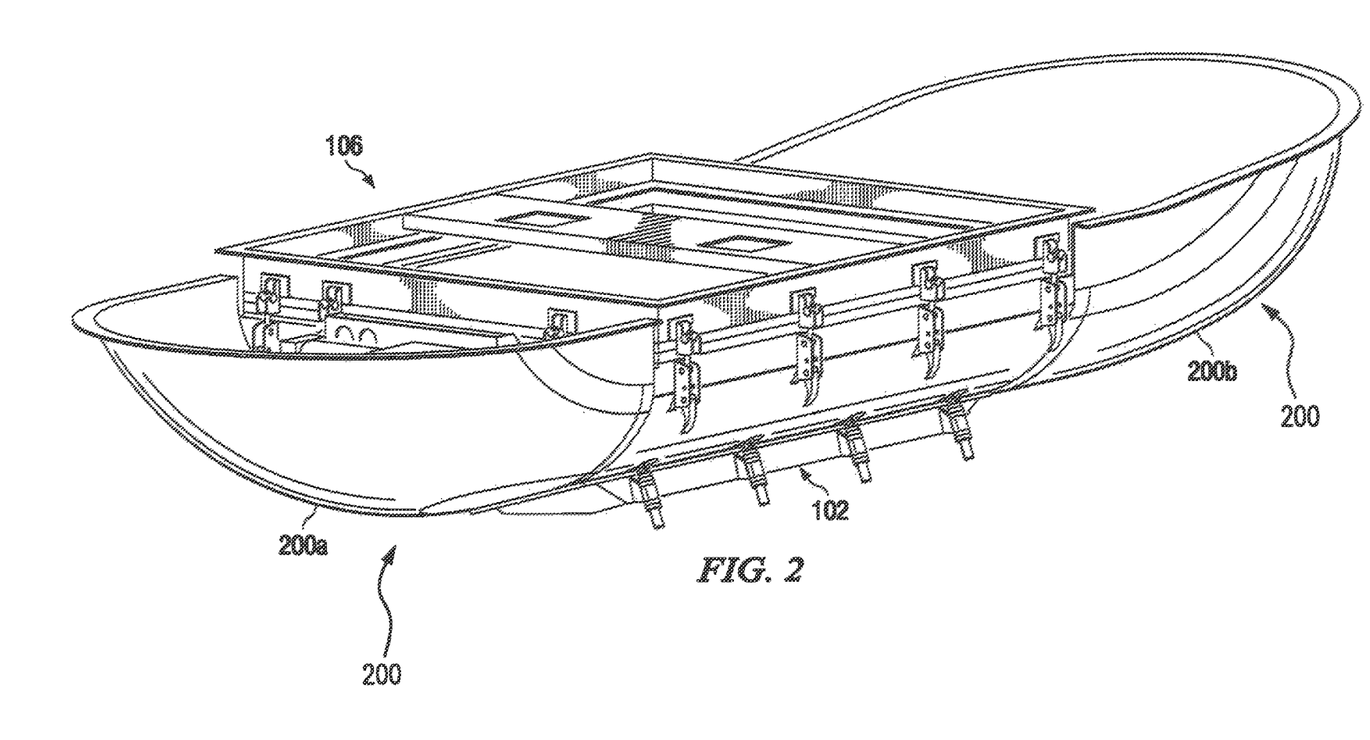
FIG. 2 is an illustration of one embodiment of a gatebox affixed to an adaptor frame with front and rear fairings.

FIG. 2 is an illustration of one embodiment of gatebox 102 affixed to adaptor frame 106 with front fairing 200a and rear fairing 200b. Aircraft 104 may include one or more fairings 200 to improve the aerodynamic characteristics of aircraft 104 and/or gatebox 102. For example, different types of gateboxes 102 may benefit from different fairings 200 with different aerodynamic properties. Agricultural gatebox 102a may benefit from aerodynamic properties different from aerodynamic properties beneficial for firefighting gatebox 102b. Therefore, agricultural gatebox 102a may have different fairings 200 than firefighting gatebox 102b.

Fairing 200 may have a shape that reduces drag of aircraft 104 and/or gatebox 102. Fairing 200 may have a shape adapted to improve the disbursement pattern of material exiting gatebox 102. For example, a user may employ a flat bottomed front fairing 200a to reduce disruptions to airflow over gatebox 102a. Fairing 200 may be adapted to a particular type of gatebox 102 or to a particular material to be released. Fairing 200 may be made of any suitable material, such as fiberglass, metal, canvas, plastic, or other strong, lightweight material. Fairings 200 may attach to aircraft 104 and/or gatebox 102, and may attach with fastenings, for example, quarter-turn fasteners.

Modifications, additions, or omissions may be made to fairings 200. Aircraft 104 may use front fairing 200a and/or rear fairing 200b during operation. In an embodiment, different gateboxes 102 may use different fairings 200. In another embodiment, a fairing 200 may provide aerodynamic properties that are beneficial to both agricultural gatebox 102a and firefighting gatebox 102b and both types of gateboxes 102 may use fairing 200.

Figure 3A:
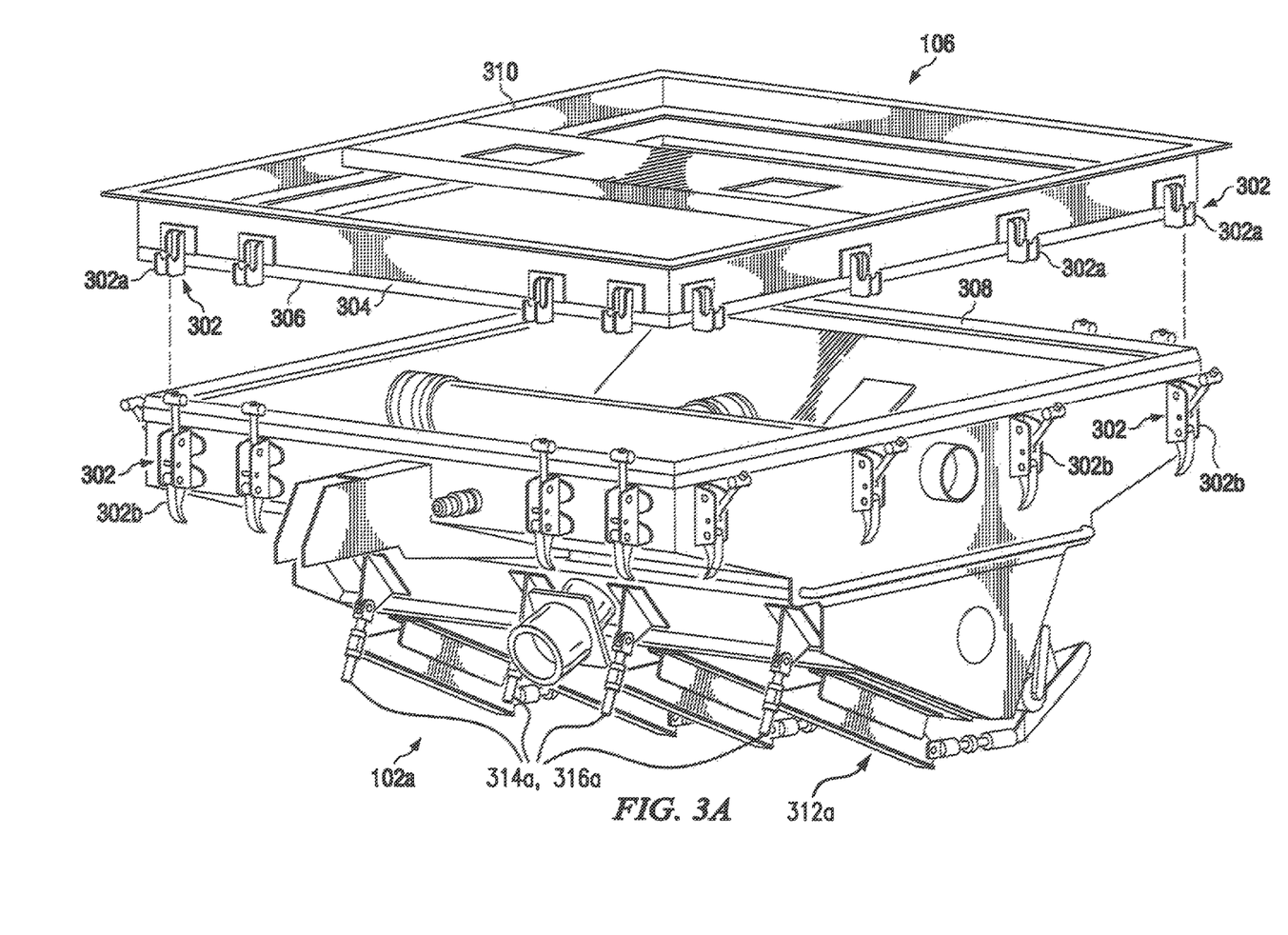
FIG. 3A is an illustration of one embodiment of an adaptor frame and a first type of gatebox.

FIG. 3A is an illustration of one embodiment of adaptor frame 106 and gatebox 102a. In the illustrated embodiment, gatebox 102a is adapted for use in agriculture to release material such as fertilizer, insecticide, herbicide, or seeds.

In the illustrated embodiment, adaptor frame 106 includes a connector structure 310, which is operable to connect adaptor frame 106 to aircraft 104, and a seal housing structure 304, which houses compressible seal 306. Adaptor frame 106 may be comprised of any material suitable for affixing to aircraft 104 and securing gatebox 102, for example, metal, fiberglass, plastic, composite, or other material. Adaptor frame 106 may be any size or shape compatible to receive various types of gateboxes 102. Upon being coupled to aircraft 104, adaptor frame 106 may also couple to gateboxes 102.

Compressible seal 306 represents a component of system 100 that forms a barrier between adaptor frame 106 and gatebox 102 when compressed. Compressible seal 306 may be comprised of any suitable material. In an embodiment, compressible seal 306 is comprised of an elastomeric material, e.g., neoprene rubber. Compressible seal 306 may be affixed to adaptor frame 106 or gatebox 102a. In the illustrated embodiment, compressible seal 306 is housed in seal housing structure 304 on adaptor frame 106. Compressible seal 306 will be discussed in more detail in FIG. 4.

Seal housing structure 304 represents a structure that houses compressible seal 306, and may further compress compressible seal 306 against seal compression structure 308 when fastenings 302 secure gatebox 102 to adaptor frame 106. In the illustrated embodiment, seal housing structure 304 is a bar on adaptor frame 106 that partially surrounds compressible seal 306. Seal housing structure 304 exposes a portion of compressible seal 306 and is operable to receive a portion of gatebox 102a. Seal housing structure 304 will be discussed in more detail in FIG. 4.

Seal compression structure 308 represents a structure that compresses compressible seal 306 against seal housing structure 304 when fastenings 302 secure gatebox 102a to adaptor frame 106. In the illustrated embodiment, seal compression structure 308 is a bar on gatebox 102a that engages compressible seal 306 through the exposed portion of seal housing structure 304 and compresses seal 306 when fastenings 302 secure gatebox 102 to adaptor frame 106. Seal housing structure 304 and seal compression structure 308 may couple similarly to a tongue and groove connection. Seal compression structure 308 will be discussed in more detail in FIG. 4.

Adaptor frame 106 and/or gatebox 102a may include any suitable number of fastenings 302 or components of fastenings 302. Fastenings 302 represent hardware operable to securely affix gatebox 102a to adaptor frame 106 such that gatebox 102a does not separate from adaptor frame 106 during operation of aircraft 104, such as latches, clamps, straps, or other suitable connectors. Adaptor frame 106 and gatebox 102a may each include components of a number of fastenings 302 that are aligned and compatible to mate. In an embodiment, adaptor frame 106 includes first component 302a of fastening 302 that couples with second component 302b of fastening 302 on gatebox 102a. In another embodiment, adaptor frame 106 or gatebox 102a may include a unitary structure that couples adapter frame 106 and gatebox 102a. In the illustrated embodiment, fastenings 302 are quick release over-center latches comprising first component 302a, a latch hook, and second component 302b, an over-center latch.

In the illustrated embodiment, gatebox 102 a includes a single door 312a that, when gatebox 102 a is affixed to aircraft 104, is perpendicular to the longitudinal axis of aircraft 104. Gatebox 102 a further includes one or more hydraulic actuators 314a or mechanical linkage that open and close the door. The hydraulic actuators couple to hydraulic hoses 316a from aircraft 104. The hydraulic hoses 316a connect to gatebox 102 a through quick release connections. Opening the door of gatebox 102 a causes material from tank 114 to release through gatebox 102 a. Gatebox 102 a may further be adapted to receive fairings 200. In an embodiment, gatebox 102 a is adapted to receive a front fairing 200 a with a flat bottom to prevent disrupting airflow over the door of gatebox 102 a.

In the illustrated embodiment, adaptor frame 106 includes four latch hooks 302a on each side. Gatebox 102a includes four quick release over-center latches 302b on each side that are aligned and compatible to mate with the latch hooks 302a of adaptor frame 106. Quick release over-center latches 302b may engage latch hooks 302a to secure gatebox 102a or 102b to adaptor frame 106. In an embodiment, engaging latches 302b to mate with latch hooks 302a does not require tools.

Modifications, additions, or omissions may be made to gatebox 102a. In an embodiment, gatebox 102a may have a manually opening door. Securing gatebox 102a may include more, fewer, or other steps. Additionally, steps may be performed in any suitable order.

Figure 3B:
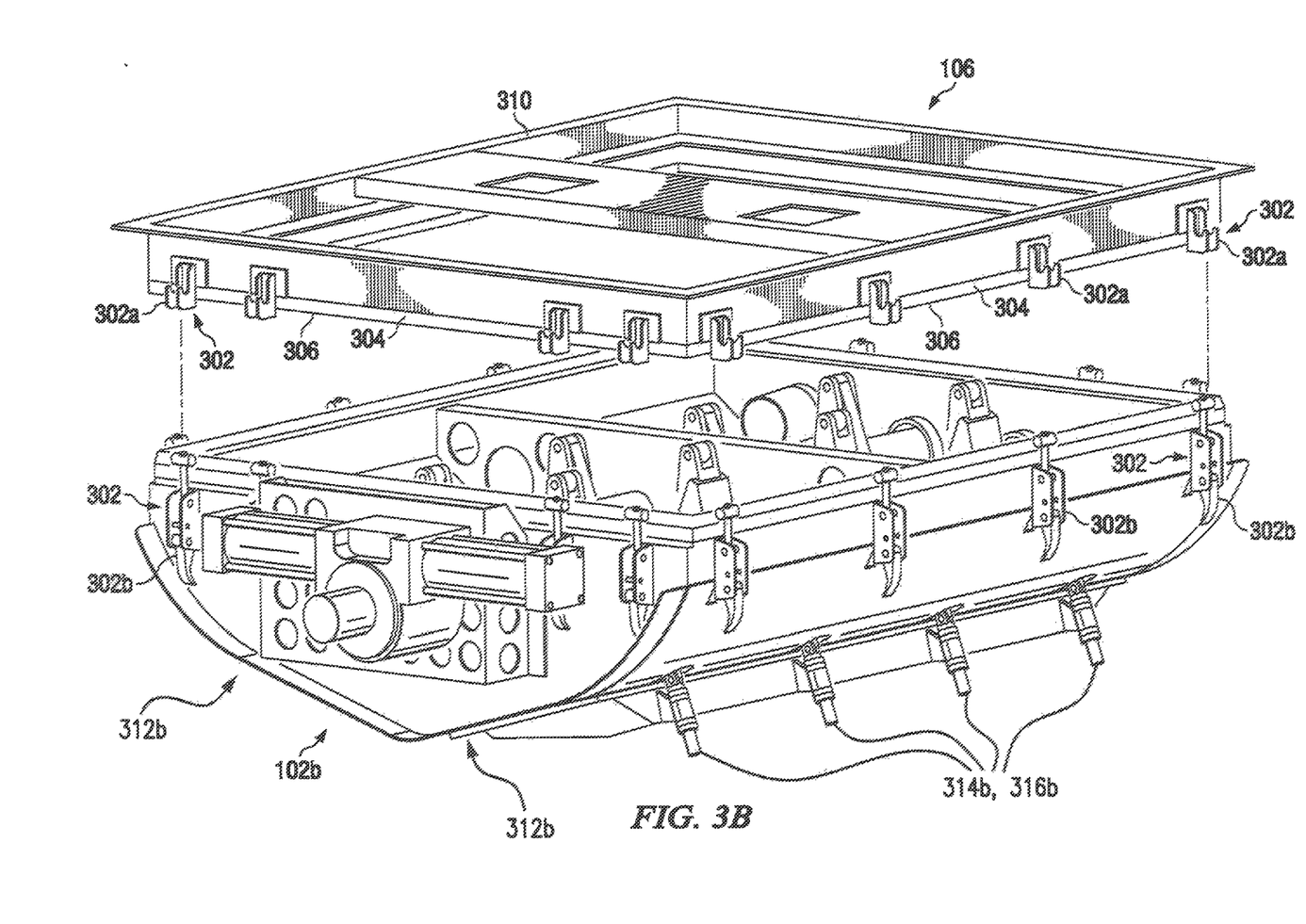
FIG. 3B is an illustration of one embodiment of the adaptor frame and a second type of gatebox.

FIG. 3B is an illustration of one embodiment of adaptor frame 106 and gatebox 102b. Gatebox 102b couples to aircraft 104 using the same adaptor frame 106 as shown in FIG. 3A with gatebox 102a. Gatebox 102b may include a compressible seal 306, a seal housing structure 304, a seal compression structure 308, and/or fastenings 302. In the illustrated embodiment, gatebox 102b includes fastenings 302 and seal compression structure 308 similar to gatebox 102a as discussed above. Gatebox 102b also couples with adaptor frame 106 in a similar manner as discussed with respect to gatebox 102a.

In the illustrated embodiment, gatebox 102 b is adapted for use in firefighting to release material such as water or fire retardant. Gatebox 102 b includes two doors 312b that, when gatebox 102 is affixed to aircraft 104, are parallel to the longitudinal axis of aircraft 104. Gatebox 102 b further includes one or more hydraulic actuators 314b or mechanical linkage that open and close the door. The hydraulic actuators 314b are coupled to hydraulic hoses 316b from aircraft 104. The hydraulic hoses connect to gatebox 102 b through quick release connections. Opening the doors of gatebox 102 b causes material from tank 114 to release through gatebox 102 b. Gatebox 102 b may further be adapted to receive fairings 200. In an embodiment, gatebox 102 b is adapted to receive a front fairing 200 a and a rear fairing 200 b.

In the illustrated embodiment, adaptor frame 106 includes four latch hooks 302a on each side. Gatebox 102b includes four quick release over-center latches 302b on each side aligned and compatible to mate with the latch hooks 302a of adaptor frame 106. Quick-release over-center latches 302b may engage latch hooks 302a to secure gateboxes 102a or 102b to adaptor frame 106. In an embodiment, engaging latches 302b over latch hooks 302a does not require tools.

Modifications, additions, or omissions may be made to gatebox 102b. In an embodiment, gatebox 102b may have manually opening doors. Securing gatebox 102b may include more, fewer, or other steps. Additionally, steps may be performed in any suitable order.

Figure 4:
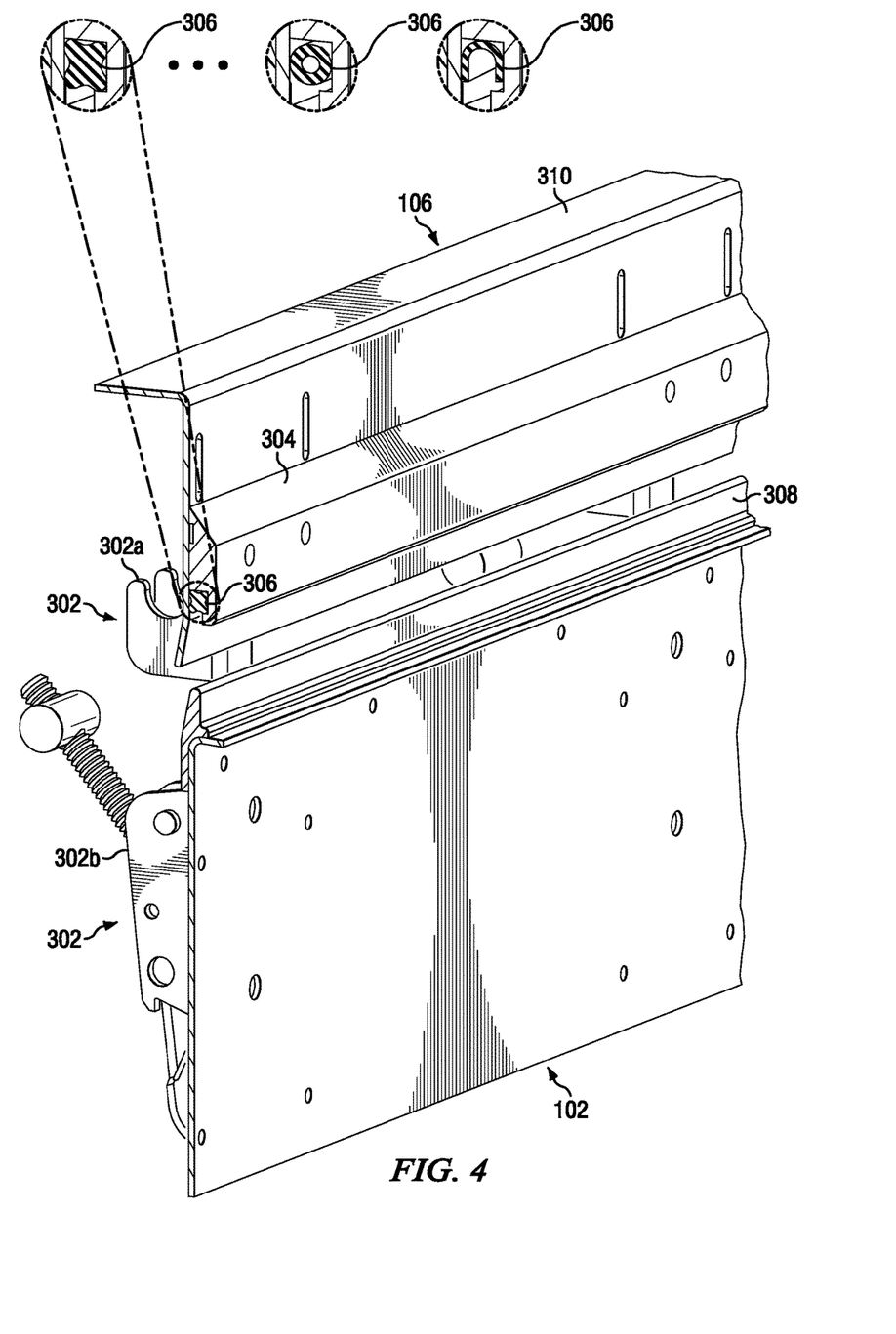
FIG. 4 is a detailed illustration of one embodiment of the adaptor frame affixing to a gatebox.

FIG. 4 is a detailed illustration of one embodiment of adaptor frame 106 affixing to gatebox 102. In the illustrated embodiment, adaptor frame 106 includes connector structure 310, seal housing structure 304, compressible seal 306, and latch hooks 302a, and gatebox 102 includes seal compression structure 308 and quick-release over-center latches 302b.

Compressible seal 306 creates a barrier between seal housing structure 304 and seal compression structure 308. Compressible seal 306 may have a particular cross sectional shape, for example "X", "O", "U", or any other suitable shape. In the illustrated embodiment, compressible seal 306 has an "X" shaped cross section. The barrier created by compressible seal 306 may be in either or both horizontal or vertical directions. In the illustrated embodiment, compressible seal 306 forms a water tight barrier in both horizontal and vertical directions. Compressible seal 306 may further be self-aligning such that once compressible seal 306 is positioned in seal housing structure 304, compressible seal 306 does not require further alignment. Therefore, a user does not have to align the seal with screw or bolt holes to attach gatebox 102.

Seal housing structure 304 represents a structure that houses compressible seal 306, and may further compress compressible seal 306 against seal compression structure 308 when fastenings 302 secure gatebox 102 to adaptor frame 106. Adaptor frame 106 or gatebox 102 may include seal housing structure 304. In the illustrated embodiment, seal housing structure 302 is a bar on adaptor frame 106 that partially surrounds compressible seal 306. Seal housing structure 304 exposes a portion of compressible seal 306 operable to receive gatebox 102.

Seal compression structure 308 represents a structure that compresses compressible seal 306 against seal housing structure 304 when fastenings 302 secure gatebox 102 to adaptor frame 106. Either adaptor frame 106 or gatebox 102 may include seal compression structure 308. In the illustrated embodiment, seal compression structure 308 is a bar on gatebox 102 that may engage compressible seal 306 through the exposed portion of seal housing structure 304 and compresses seal 306 when fastenings 302 secure gatebox 102 to adaptor frame 106. Seal housing structure 304 and seal compression structure 308 may couple similarly to a tongue and groove connection.

Adaptor frame 106 and/or gatebox 102 may include a number of fastenings 302, or components of fastenings 302. Fastenings 302 represent hardware operable to securely affix gatebox 102 to adaptor frame 106 such that gatebox 102 does not separate from adaptor frame 106 during aircraft 104 operation. For example, fastenings 302 may include latches, clamps, straps, or other suitable connectors. Adaptor frame 106 and gatebox 102 may each include complimentary components of fastenings 302. In an embodiment, adaptor frame 106 includes first component 302a of fastening 302 that couples with second component 302b of fastening 302 on gatebox 102. In another embodiment, adaptor frame 106 or gatebox 102 may include a unitary structure that couples adapter frame 106 and gatebox 102. In the illustrated embodiment, fastenings 302 are quick release over-center latches comprising first component 302a, a latch hook, and second component 302b, an over-center latch.

Modifications, additions, or omissions may be made to fastenings 302, gateboxes 102, or adaptor frame 106. For example, there may be any suitable number of fastenings 302 in system 100. Securing gateboxes 102 may include more, fewer, or other steps. Additionally, steps may be performed in any suitable order.

Figure 5:
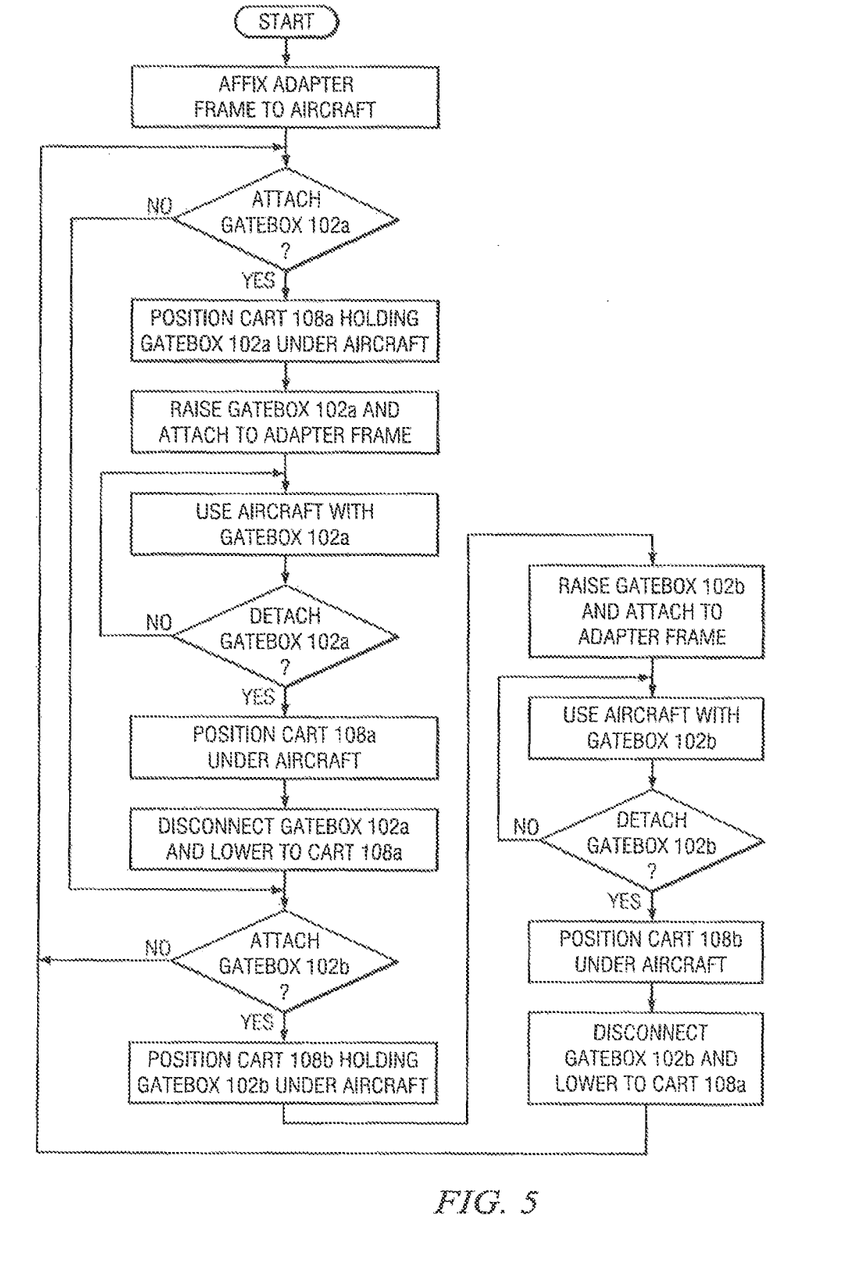
FIG. 5 is a flow chart illustrating one embodiment of a method for removing a first gatebox from an aircraft and affixing a second gatebox to the aircraft.

FIG. 5 is a flow chart illustrating one embodiment of a method for attaching a first gatebox 102a to aircraft 104, detaching the first gatebox 102a from aircraft 104, attaching a second gatebox 102b to aircraft 104, and detaching the second gatebox 102b. A user may remove fairings 200, if any, before starting this method.

At step 502, a user affixes adaptor frame 106 to aircraft 104. Adaptor frame 106 may affix to aircraft 104 in any manner sufficient for aircraft 104 to operate with gatebox 102 secured to adaptor frame 106. Adaptor frame 106 may secure to aircraft 104 with bolts, screws, welds, clamps, latches, or other connectors suitable to securely affix adaptor frame 106 to aircraft 104.

At step 504, the user determines whether to attach gatebox 102a. If the user decides to attach gatebox 102a the method continues to step 506. If the user decides not attach gatebox 102a, the user may attach gatebox 102b at step 518.

At step 506, the user positions cart 108a holding gatebox 102a under aircraft 104. At step 508, the user attaches gatebox 102a to adaptor frame 106. To attach gatebox 102a, the user engages lift 112a to raise gatebox 102a to adaptor frame 106. The user engages fastenings 302 to secure gatebox 102a to adaptor frame 106. The user may further connect connections between aircraft 104 and gatebox 102a such as electrical, fiber optic, hydraulic, pneumatic, or other connections. A user may connect the connections between aircraft 104 and gatebox 102a while gatebox 102a rests on cart 108a or after the user secures gatebox 102a to aircraft 104. At step 510, the user may operate aircraft 104 with gatebox 102a.

At step 512, the user determines whether to detach gatebox 102a. If the user decides to detach gatebox 102a, the method continues at step 514. If the user decides not to detach gatebox 102a, the method returns to step 510 and the user may continue to operate aircraft 104 with gatebox 102a.

At step 514, the user positions cart 108a under aircraft 104. At step 516, the user detaches gatebox 102a from adaptor frame 106. The user engages lift 112a to raise support 110a to gatebox 102a. The user disengages fastenings 302 to disconnect gatebox 102a from adaptor frame 106 such that gatebox 102a rests on support 112a. The user may further disconnect connections between aircraft 104 and gatebox 102a such as electrical, fiber optic, hydraulic, pneumatic, or other connections. A user may disconnect the connections between aircraft 104 and gatebox 102a while gatebox 102a is secured to adaptor frame 106 or after disengaging fastenings 302 and gatebox 102 rests on support 110a. The user engages lift 112a to lower support 110a to cart 108a and may move cart 108a away from aircraft 104 into a storage location.

At step 518, the user determines whether to attach gatebox 102b. If the user decides to attach gatebox 102b, the method continues at step 520. If the user decides not to attach gatebox 102b, the user may determine whether to attach gatebox 102a at step 504.

At step 520, the user positions cart 108a holding gatebox 102b under aircraft 104. At step 522, the user attaches gatebox 102b to adaptor frame 106. To attach gatebox 102b, the user engages lift 112b to raise gatebox 102b to adaptor frame 106. The user engages fastenings 302 to secure gatebox 102b to adaptor frame 106. The user may further connect connections between aircraft 104 and gatebox 102b such as electrical, fiber optic, hydraulic, pneumatic, or other connections. A user may connect the connections between aircraft 104 and gatebox 102b while gatebox 102a rests on cart 108b or after the user secures gatebox 102b to aircraft 104. At step 524, the user may operate aircraft 104 with gatebox 102a.

At step 526, the user determines whether to detach gatebox 102b. If the user decides to detach gatebox 102b, the method continues at step 528. If the user decides not to detach gatebox 102b, the method returns to step 524 and the user may continue to operate aircraft 104 with gatebox 102b.

At step 528, the user positions cart 108b under aircraft 104. At step 530, the user detaches gatebox 102b from adaptor frame 106. The user engages lift 112b to raise support 110b to gatebox 102b. The user disengages fastenings 302 to disconnect gatebox 102b from adaptor frame 106 such that gatebox 102b rests on support 112b. The user may further disconnect connections between aircraft 104 and gatebox 102b such as electrical, fiber optic, hydraulic, pneumatic, or other connection. A user may disconnect the connections between aircraft 104 and gatebox 102b while gatebox 102b is secured to adaptor frame 106 or after disengaging fastenings 302 and gatebox 102 rests on support 110b. The user engages lift 112a to lower support 110b to cart 108b and may move cart 108b away from aircraft 104 into a storage location. After step 530, the method returns to step 504 and the user determines whether to attach gatebox 102a.

Modifications, additions, or omissions may be made to method 500. The method may include more, fewer, or other steps. Additionally, steps may be performed in any suitable order.

Certain embodiments of the invention may provide one or more technical advantages. A technical advantage of one embodiment includes reducing the time and personnel required to attach, detach, and/or switch gateboxes on an aircraft. Another technical advantage of an embodiment is that tools may not be required to attach, detach, and/or switch gateboxes on an aircraft. Therefore, the amount of time, the amount of training, the amount of workers, and the number of tools required to attach, detach, and/or switch gateboxes on an aircraft is reduced. Accordingly, the aircraft spends less time out of useful operation due to attaching, detaching, and/or switching gateboxes.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An aircraft gatebox affixing system, comprising:
a first gatebox configured to provide a firefighting functionality and to release a first material selected from one of water and a fire retardant while affixed to an aircraft;
a second gatebox configured to provide agricultural functionality and to release a second material selected from one of a fertilizer, an insecticide, an herbicide, and seeds while affixed to an aircraft, the first gatebox and the second gatebox being of different constructions;
a frame configured to affix to an aircraft and interchangeably couple to a selected one of the first gatebox and the second gatebox;
a plurality of fastenings configured to interchangeably couple the selected one of the first gatebox and the second gatebox to the frame; and
a seal configured to create a barrier between the frame and the selected one of the first gatebox and the second gatebox, wherein the seal is recessed within the frame to receive a compression structure from the selected one of the first gatebox and second gatebox, the recessed seal is operable to self-align the selected one of the first gatebox and second gatebox when coupled to the frame.

2. The system of claim 1, wherein the seal is a compressible seal and is coupled to one or more from the set comprising: the first gatebox, the second gatebox, and the frame.

3. The system of claim 2, further comprising:
a seal housing structure adapted to house the compressible seal, the seal housing comprising a flange extending from the frame; and
a seal compression structure adapted to mate to the seal housing structure, wherein the plurality of fastenings secure the selected one of the first gatebox and the second gatebox to the frame and the seal compression structure mates with the seal housing structure and compresses the compressible seal against the seal housing structure.

4. The system of claim 1, wherein the seal has a cross sectional shape of one from a set comprising: X-shaped, O-shaped, and U-shaped.

5. The system of claim 1, further comprising a cart comprising:
a gatebox support configured to secure a selected one of the first gatebox and the second gatebox; and
a lift configured to vertically lift the support.

6. The system of claim 1, wherein the plurality of fastenings are over-center latches.

7. The system of claim 1, further comprising a controller communicatively coupled to at least one of the aircraft, the selected one of the first gatebox and the second gatebox, and a sensor, wherein the controller is configured to receive signals to control the selected one of the first gatebox and the second gatebox.

8. The system of claim 1, further comprising a fairing configured to couple to at least one of the aircraft, the frame, and the selected one of the first gatebox and the second gatebox, and further configured to change airflow around the selected one of the first gatebox and the second gatebox.

9. An aircraft gatebox affixing system, comprising:
a frame affixable to an aircraft, wherein the frame is configured to receive a first gatebox configured to provide a firefighting functionality and to release a first material selected from one of water and a fire retardant and a second gatebox configured to provide agricultural functionality and to release a second material selected from one of a fertilizer, an insecticide, an herbicide, and seeds, the first gatebox and the second gatebox being of different constructions, and the frame is configured to interchangeably couple to a selected one of the first gatebox and the second gatebox;
a plurality of fastenings configured to couple the selected one of the first gatebox and the second gatebox to the frame; and
a seal configured to create a barrier between the frame and a selected one of the first gatebox and the second gatebox, wherein the seal is recessed within the frame to receive a compression structure from the selected one of the first gatebox and second gatebox, the recessed seal is operable to self-align the selected one of the first gatebox and second gatebox when coupling to the frame.

10. The apparatus of claim 9, further comprising:
a first gatebox configured to release a first material while affixed to an aircraft;
a second gatebox configured to release a second material while affixed to an aircraft, and
wherein the seal is coupled to one or more from a set comprising: the first gatebox, the second gatebox, and the frame.

11. The apparatus of claim 10, further comprising:
a seal housing structure adapted to house the seal, the seal housing comprising a flange extending from the frame, and wherein the seal is a compressible seal; and
a seal compression structure adapted to mate to the seal housing structure, wherein the plurality of fastenings secure the selected one of the first gatebox and the second gatebox to the frame and the seal compression structure mates with the seal housing structure and compresses the compressible seal against the seal housing structure.

12. The apparatus of claim 9, wherein the plurality of fastenings are over-center latches.

13. The apparatus of claim 9, wherein the seal has a cross sectional shape of one from a set comprising: X-shaped, O-shaped, and U-shaped.

14. An aircraft gatebox affixing method, comprising:
affixing to an aircraft a frame configured to couple to a first aircraft gatebox configured to provide a firefighting functionality and to release a first material selected from one of water and a fire retardant and a second aircraft gatebox configured to provide agricultural functionality and to release a second material selected from one of a fertilizer, an insecticide, an herbicide, and seeds, the first gatebox and the second gatebox being of different constructions, and wherein the frame is configured to interchangeably couple to a selected one of the first gatebox and the second gatebox, wherein one or more of the frame, the first gatebox, and the second gatebox include a recessed seal configured to create a self-aligned barrier between the frame and the selected one of the first gatebox and the second gatebox;

coupling to the frame the first gatebox by engaging one or more of a plurality of fastenings;

removing from the frame the first gatebox by disengaging one or more of the plurality of fastenings; and coupling to the frame the second gatebox by engaging one or more of the plurality of fastenings.

15. The method of claim 14, wherein the seal is a compressible seal and is coupled to one or more from the set comprising: the first gatebox, the second gatebox, and the frame.

16. The method of claim 15, wherein one or more of the frame and the selected one of the first gatebox and the second gatebox include:

a seal housing structure adapted to house the compressible seal, the seal housing comprising a flange extending from the frame; and a seal compression structure adapted to mate to the seal housing structure, wherein the plurality of fastenings secure the selected one of the first gatebox and the second gatebox to the frame and the seal compression structure mates with the seal housing structure and compresses the compressible seal against the seal housing structure.

17. The method of claim 14, wherein the plurality of fastenings are over-center latches.

18. The method of claim 14, wherein the seal has a cross sectional shape of one from a set comprising: X-shaped, O-shaped, and U-shaped.

19. The method of claim 14, further comprising communicatively coupling a controller to at least one of the aircraft, the selected one of the first gatebox and the second gatebox, and a sensor, wherein the controller is configured to receive signals to control the selected one of the first gatebox and the second gatebox.

20. The method of claim 14, further comprising coupling a fairing configured to change airflow around the selected one of the first gatebox and the second gatebox coupled to the aircraft to at least one of the aircraft, the frame, and the selected one of the first gatebox and the second gatebox.

* * * * *